A. H. MASON.
NUT LOCK.
APPLICATION FILED OCT. 6, 1921.

1,437,346.

Patented Nov. 28, 1922.

Inventor
A. H. Mason.

By
Lacey & Lacey, Attorneys

Patented Nov. 28, 1922.

1,437,346

UNITED STATES PATENT OFFICE.

ALBERT H. MASON, OF GAULEY BRIDGE, WEST VIRGINIA.

NUT LOCK.

Application filed October 6, 1921. Serial No. 505,858.

*To all whom it may concern:*

Be it known that I, ALBERT H. MASON, a citizen of the United States, residing at Gauley Bridge, in the county of Fayette and State of West Virginia, have invented certain new and useful Improvements in Nut Locks, of which the following is a specification.

The present invention relates to improvements in nut locks especially adapted for use in connection with rail joints, but which may also be used for locking bolts or nuts and prevent the same from unscrewing on any kind of structure having several of the bolts in a row.

The main object of the invention is to provide a nut lock of this character which may be applied after the nuts have been drawn up tightly and it is constructed to reach across from one nut to the next.

A further object of the invention is to provide a nut lock of the class described which is easily applied, efficient in use and very cheap to manufacture. It is also made very strong and cannot be injured by rough handling.

One embodiment of the invention is illustrated in the accompanying drawing, in which, Figure 1 shows in elevation an assembled view of the lock as applied to a rail joint;

The nut lock consists of two plates 10 which are parallel to each other and spaced apart a distance equal to the width of the nut or bolt head for which the lock is intended. The nuts 11 may be of any conventional shape, such as square or hexagonal, that is to say, they are provided with flat parallel sides.

The length of the plates 10 is governed by the distance apart of the nuts to be locked and it is slightly greater than the over-all distance measured from the outward sides of the two adjacent nuts. These plates 10 are rigidly connected by means of transverse arms 12 which are secured together by means of rivets 13 or any other suitable means.

Figure 1:
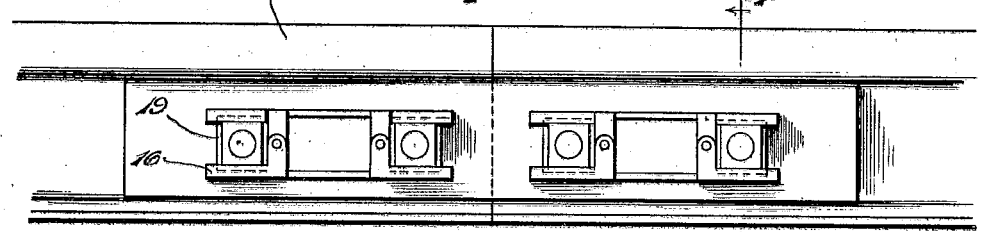
Figure 2:
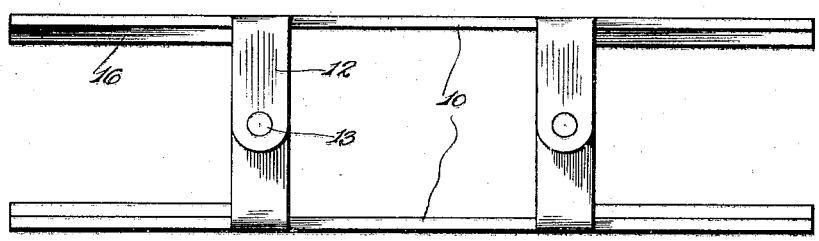
Figure 2 is a bottom plan view in larger scale of the nut lock detached.
Figure 3:
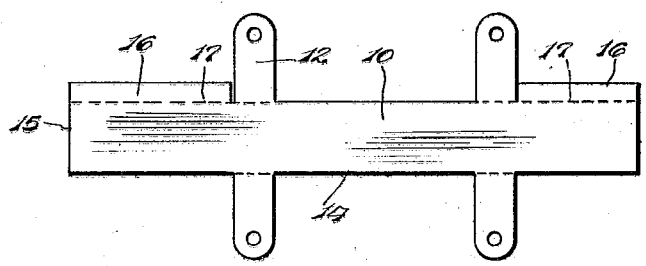
Figure 3 is a plan view of a blank for the lock.
Figure 4:
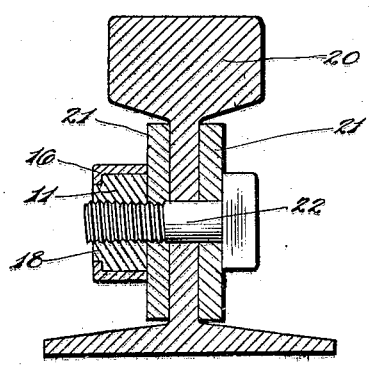
Figure 4 is a transverse section along line 4—4 of Figure 1 and in larger scale.

The blank from which the plates 10 are made is the piece shown in Figure 3, where one edge 14 is straight and the other side edge is recessed between the arms 12, the end portions beyond said arms being wider as at 15. The parallel edges 16 of these end portions are intended to be folded inward along the dotted lines 17 so as to form right angles with the body of the plate 10, as best seen in Figure 4. These flanges 16 are intended to contact with the top or outer face 18 of the nuts 11 when the lock is in position or if the nuts are provided with recessed shoulders 19, the flanges 16 engage in the recess portions.

After the rails 20 have been placed in position with their ends abutting, the fish plates 21 are adjusted and the bolts 22 pushed through the holes in the fish plates and the rails, and the nuts 11 drawn up tightly on the bolts. Care must be taken that the flat sides of two adjacent nuts are in alignment with each other, so that the nut lock can be slipped across the flat sides and pushed down against the fish plate over the nut side. The flanges 16 will then engage with the top or outer surface 18, or in the recessed part thereof. It will now readily be seen, that any loosening of the nuts, caused by the constant vibrations of the rails and bolts while the rolling stock is passing over them, cannot occur, so that, in this manner, the bolts are prevented from falling out, thereby obviating accidents at the joints caused by displacement of the rail ends.

The nut locks can be manufactured cheaply by first stamping out the blanks in the shape indicated in Figure 3 and then pressing the arms 12 and the flanges 16 at right angles to the main body of the plate 10 and finally riveting the corresponding arms on two of the plates together to form a unit. The height of the lock should be approximately the same, or slightly less, than the height of the nuts for which they are intended.

Having thus described the invention what is claimed as new is:

1. A nut lock comprising a pair of similar rigid members disposed parallel at a distance of the width of the nuts to be locked, the walls of said members being perpendicular, rigid arms extending from the side edges of said members and means securing corresponding arms of the two members rigidly together.

2. A blank for a nut lock consisting of a substantially rectangular rigid plate, a pair of spaced lateral arms extending from each side edge of said plate and provided with apertures at their outer ends, one side edge of the plate following a straight line from end to end and the other side edge having longitudinal flange extensions between the arms and its ends.

In testimony whereof I affix my signature.

ALBERT H. MASON. [L. S.].